Patented Apr. 19, 1949

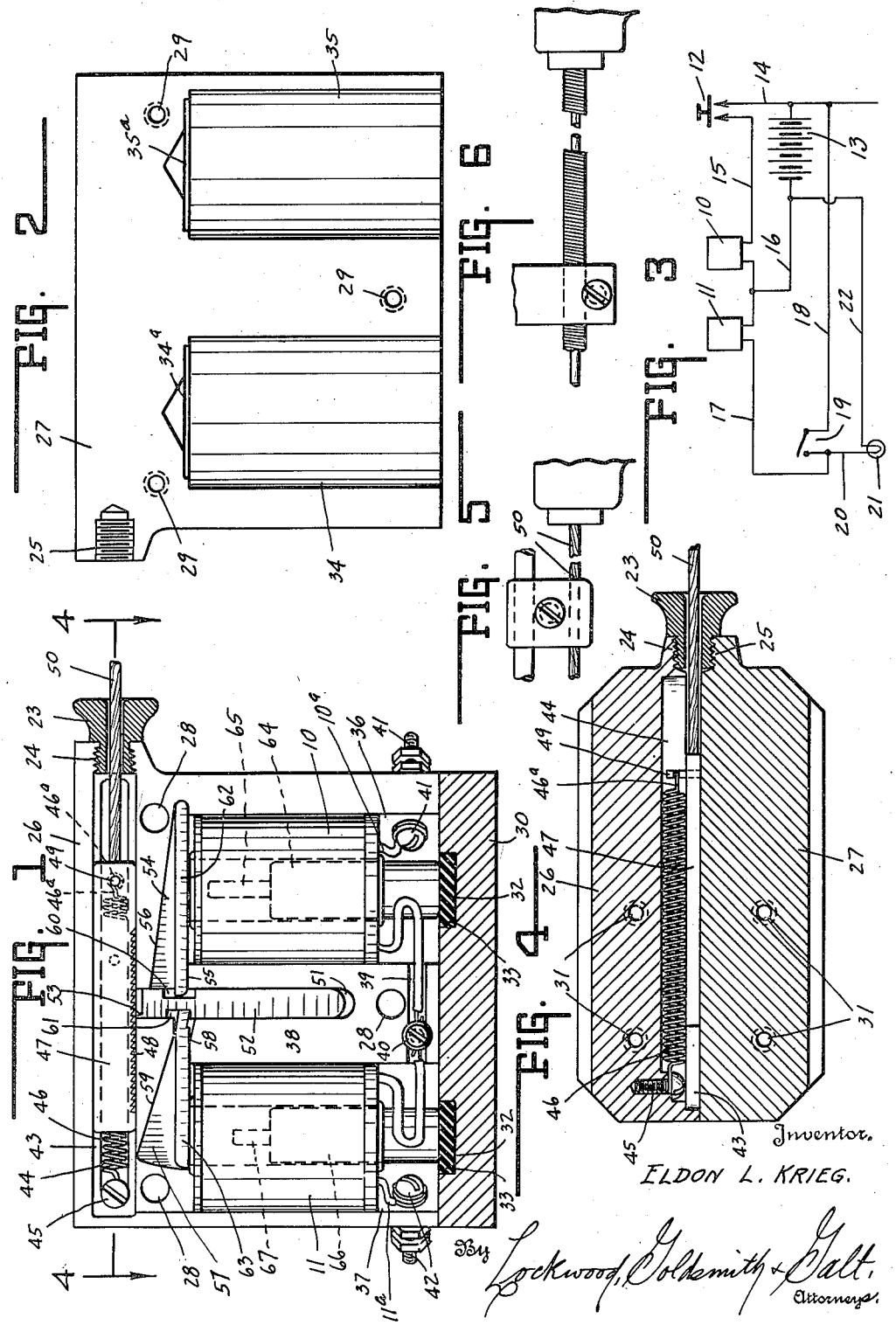

2,467,485

UNITED STATES PATENT OFFICE 2,467,485

AUTOMATIC THROTTLE CONTROL SYSTEM

Eldon L. Krieg, South Whitley, Ind., assignor to The Maco Corporation, Huntington, Ind., a corporation Application May 9, 1947, Serial No. 746,977

11 Claims. (Cl. 192—3)

This invention relates to a control mechanism for the throttle system of a self-propelled vehicle.

Such a vehicle of passenger, truck, or bus type includes an internal combustion engine the speed of which is controlled by an accelerator normally constrained to low idle position; that is, when not foot engaged the accelerator returns to an orignial position wherein the engine is supplied with just enough fuel to keep it operating.

Since, for vehicle travel, the accelerator normally must be held depressed against such constraint long driving results in driver tiring. Accordingly, the present invention is directed to the holding of the fuel control system in the position corresponding to the speed desired. Also, in common with devices of this general character when slow down or stopping is desired the present invention is deactivated automatically as when the brakes are applied.

The present invention, accordingly, is directed to a control mechanism of the aforesaid type which is of a character such that increase in speed automatically releases the control; second, a device which is electrically actuated; and third, a device wherein electrical energy is only required to initiate the control and wherein the release automatically can be effected by speed increase or by braking whichever driving condition is required as in an emergency.

The chief feature of the present invention resides in the formation of a control mechanism that not only accomplishes the aforesaid objects but is of comparatively small size, easily mountable in any convenient location on the vehicle, and which comprises but few parts.

Other objects and features of the invention will be set forth more fully hereinafter.

The full nature of the invention will be understood from the accompanying drawings and the following description and claims:

In the drawings Fig. 1 is a side elevation of the interior of one half of the upper portion of the device substantially full size, the base being shown in central section.

Fig. 2 is a similar view of the other half of the upper portion.

Fig. 3 is a circuit wiring diagram of the invention.

Fig. 4 is a sectional view taken on line 4—4 of Fig. 1.

Fig. 5 is a schematic diagram of a rigid connection between an accelerator and the invention.

Fig. 6 is a similar view of a Bowden wire type of connection.

Referring to Fig. 3, 10 indicates a solenoid and 11 a second solenoid. 12 indicates a push button or comparable switch which can be mounted on the toe board, dash, steering wheel, or any other convenient location. It is always in open circuit condition and is closable by finger or foot pressure as desired.

13 indicates a conventional source of energy which is connected by a branch line 14 to the switch 12, same being connected by line 15 to solenoid 10 in turn connected by return line 16 to the source. Solenoid 11 is connected by the same line 16 to said source. Its supply is from line 17 connected in multiple with the stop light circuit including supply line 18, brake lever operable or controlled switch 19, line 20, stop light 21, and return line 22. Switch 19 accordingly automatically controls solenoid 11 when the brake pedal is depressed all without any conscious control of the driver.

Herein solenoid 10 constitutes the initiating solenoid and solenoid 11 the releasing solenoid. Normally each is deenergized at all times except when the control is to be imposed or when the control is to be released upon desired speed reduction, such energization being of momentary character, although a longer period of energization is not objectionable should, for example, the brake pedal be held depressed for a considerable period or switch 12 be held closed for a considerable period.

In Figs. 1, 4, and 5 there is illustrated a bell mouthed fitting 23 threaded in complementary half sockets 24—25, see Figs. 1, 2, and 4, of the complementary body portions 26 and 27, respectively, suitably secured together by suitable means associated with openings 28 and 29, respectively, which register. A base 30 is suitably secured to both by means not shown. Tapped holes 31 are adapted to take bracket mounting bolts whereby the unit may be suitably mounted upon the vehicle where most convenient.

Base 30 includes two recesses 32 which seat silencing bumpers such as hard rubber or fiber inserts 33, see Fig. 1. Housing portion 27, see Fig. 2, in addition to holes 29 and half hole 25 includes two parallel spaced semi-cylindrical sockets 34 and 35, the former for solenoid 10 and the latter for solenoid 11 accommodation. These sockets extend from the base contacting face and may terminate in the central counter bored portions 34ª and 35ª.

Having thus described two of the major por- tions of the housing, reference will now be had to the third portion thereof, to-wit; portion 26. Extending from the base engaging face are complementary semi-cylindrical sockets 36 and 37 which at the inner ends may be counterbored if desired. Such sockets provide central portion 38 which is provided with a cross-channel 39 and a terminal stud 40 for contact purposes. To the same may be connected ground wire 16 if a grounded circuit system be employed. Terminal posts 41 and 42 extend through the housing in insulated relation thereto and are connected to leads 10a and 11a of solenoids 10 and 11, respectively. Terminal 41 is connected to line 15, see Fig. 3, and terminal 42 is connected to line 17, see same figure.

Referring more particularly to Fig. 1, note that at the end of portion 26 opposite the base there is provided a channel 43 that is closed at one end and at the other end communicates with threaded half opening 24. This channel is counterbored or recessed as at 44, same terminating short of the ends of the channel but otherwise being coextensive therewith.

A screw 45 anchors one end of tension spring 46 having an opposite end 46a of loop type. This spring is seated and extensible and contractible in counterbore or recess 44. Slidable in channel 43 is bar member 47 having rack teeth 48 on its lower face and carrying a pin 49 that rides in the recess and has the loop end 46a of the spring 46 associated therewith. Whenever the bar is moved to the right, spring 46 is extended.

Connected to said bar is one end of a flexible cable 50 of suitable length. This passes through the bell-mouthed member 23 and has its opposite end suitably secured to the accelerator pedal or a part movable thereby so that in effect cable movement is responsive to accelerator movement. Spring 46 is of much less force than the spring force applied to the accelerator to return same toward low idle position. Therefore, in the flexible cable type of connection the device spring 46 has the function of taking up any slack occurring in the cable upon accelerator advance. When a mechanical link connection is substituted for the cable as shown in Fig. 5 or a Bowden wire connection is substituted, see Fig. 6, slack removing spring 46 and its end connections may be omitted.

Reference will again be had more particularly to Fig. 1 and the upper central portion thereof. Communicating with and intermediate the ends of channel 43 is a transverse channel 51. The lower end is closed. This channel is formed in partition 30. Slidable in channel 51 is the latch member or pawl 52 having one or more rack engaging teeth 53. The depth of said channel 51 is such that when the pawl is bottom seated teeth 53 clear teeth 48 on rack bar or ratchet 47.

When the pawl is raised into bar engagement, it interlocks therewith at any position. The bar, confined in its channel, and due to accelerator spring force applied holds the pawl against its channel side wall and prevents its release. When the accelerator is advanced a slight degree, as by tapping thereon with the toe, the bar is advanced and the bar tooth cams the pawl downwardly against pawl channel side wall friction until the pawl tooth or teeth clears the rack teeth. This automatically releases the interlock between pawl and rack bar.

Housing 26 to the right of channel 51 and below channel 43 includes a laterally directed channel 54 which at its left end communicates with channel 51 forming shoulder 55 therebetween. The upper end of channel 54 is inclined as at 56 for clearance purposes.

Housing 26 to the left of channel 51 and below channel 43 includes a laterally directed channel 57 which at its right end communicates with channel 51 forming fulcrum 58 therebetween. The upper end of channel 57 is inclined as at 59 for clearance purposes.

Pawl 52 near its upper end and at opposite sides is notched out as at 60 and 61, said notches confronting channels 54 and 57, respectively. In each of the last mentioned channels is a bar 62 and 63, respectively. Since channels 54 and 57 communicate near their opposite ends with solenoid receiving recesses 36 and 37, respectively, at their upper ends, the bars 62 and 63 overlie the solenoids 10 and 11.

In solenoid 10 is a core 64 carrying stem 65. In solenoid 11 is a core 66 carrying stem 67. Since the adjacent ends of bars 62 and 63 are always seated in notches 60 and 61, respectively, and overlie the said solenoids, whenever either is energized the respective core is elevated from its rest position on bumper and silencer 33, respectively, and the stem carried by the core strikes the overlying bar to tilt the same.

When solenoid 10 is momentarily energized bar 62 is tilted and in so doing pawl 52 is elevated so that the tooth or teeth 53 engages the rack bar teeth. This results in the rack bar being locked in an advanced throttle position. This condition will prevail so long as desired. Thus, the driver can rest his foot while the throttle is mechanically held at the selected position. Push button 12 effects solenoid 10 energization as and when desired. Even if it were actuated while the control was holdingly effective, the only result would be to raise core 64 and it would be held elevated as long as switch 12 were held closed.

Should traffic conditions require an advance in speed, the accelerator is further advanced. Bar 47, movable in accordance therewith advances to the left and as a result pawl 52 returns to inactive or nonlocking position by gravity where it remains until it is desired to again impose automatic control at the previous speed, a lower speed, or a higher speed which imposition is effected by momentarily closing switch 12.

Should, however, traffic conditions require an immediate decrease in speed it is obvious that the brakes should be applied. Whenever the brake pedal is engaged and actuated sufficiently to close the stop light circuit, now common to most vehicles and required by statute, the solenoid 11 in multiple with said stop light 21 is also energized.

When so energized momentarily or longer, which is immaterial, the core 66 is elevated with its stem 67 to tilt bar 63 upwardly. Such tilting results in the notch seated end of said bar moving downwardly to sufficiently withdraw pawl 52 so that the tooth or teeth 53 of the same release from the ratchet teeth.

Further pawl retraction into channel 51 is effected by gravity upon teeth disengagement, since bar 63 is its lowest position and notch 61 is longer than necessary to effect pawl release. Thus, solenoid 11 constitutes a lock release power source only.

Upon effecting such release, the automatic control is no longer imposed and can only be reimposed by again closing switch 12 and reenergizing solenoid 10. Thus, the solenoids are only required to be momentarily energized and constitute no drain upon the power source while the control is imposed.

From the foregoing, it also will be obvious that the only manual operation required is to momentarily energize solenoid 10 by closing switch 12 or its equivalent. The control is of the safety type in that if increased speed or decreased speed is instantaneously required, the same is automatically effected by the vehicle driver advancing the accelerator or applying the brakes and all without any attention or regard to the previously imposed control. This means instantaneous release of the control in emergencies. Also, this invention is so devised that repetitious operation of either solenoid or continuous energization of said solenoid has no further effect upon the control after the initial momentary energization.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. In a throttle control system for holding an accelerator in a position above low idle, such accelerator being normally constrained by suitable means to low idle position, the combination therewith of a to and fro movable member adapted for operative connection to such accelerator, a second member movable to and fro adapted for first member engagement to hold the latter in an advanced speed position and to release same to the accelerator constraining means, electrically operable means for moving said second member into first member holding position, and electrically operable means for moving said second member to release said first member.

2. A throttle system as defined by claim 1 wherein each electrical operable means is required to be but momentarily energized to effect the second member movement specified.

3. A throttle system as defined by claim 1 wherein the first member comprises a ratchet toothed bar and the second member comprises a transversely disposed toothed pawl.

4. A throttle system as defined by claim 1 wherein the first member comprises a ratchet toothed bar and the second member comprises a transversely disposed toothed pawl, the pawl being freely movable, lateral pressure upon the pawl incident to the force imposed by the accelerator constraining means constituting the sole force holding the pawl and ratchet members together.

5. A throttle control system as defined by claim 1 wherein the first mentioned member is operatively connected to such accelerator by a flexible cable, and a spring is provided to maintain the tautness in such cable, the force of said spring being less than the force of the accelerator constraining means.

6. In a throttle control the combination of an elongated rack member confined to longitudinal movement only, an elongated transversely disposed longitudinally reciprocable pawl, lever members disposed upon opposite sides of said pawl for independently effecting longitudinal movement of said pawl, and an impact means for each lever member, one lever member being of the first class and the other lever member being of the third class.

7. A control as defined by claim 6 wherein each impact means comprises a reciprocable solenoid core, and a solenoid for electromagnetically moving said core for effecting pawl movement through its associated lever member.

8. In a self propelled vehicle having a source of electrical energy, a braking system, a stop light, a switch therefor operatively associated with the system and the source, and a fuel control system having an accelerator, and means normally constraining the accelerator to low idle position, the combination therewith of a reciprocable member operatively connected to such accelerator and subject to the constraining means imposed thereon, a second to and fro movable member disposed substantially transverse to the first member and arranged when engaged therewith to hold such accelerator to a speed position above low idle position, electrically operable means for effecting member engagement including a manually closable normally open switch disposed for driver operation and connected to the source, and other electrically operable means in multiple with the stop light and automatically controlled by the switch therefor for automatically effecting member disengagement upon operation of the braking system.

9. Structure as defined by claim 8 wherein the first member includes ratchet teeth and the second member is toothed for tooth locking engagement therewith, the cooperating toothed engagement permitting first member movement upon advance of the accelerator to a higher speed position, such advance movement automatically effecting member disengagement.

10. Structure as defined by claim 8 wherein the source is connectible to both said electrically operable means for at least momentary energization of the same.

11. Structure as defined by claim 10 wherein continued connection of either electrical means and the source beyond the momentary connection thereof is normally ineffective for further control purposes.

ELDON L. KRIEG.

REFERENCES CITED

The following references are of record in the file of this patent:

UNITED STATES PATENTS

| Number | Name | Date |
|---|---|---|
| 1,436,154 | Dickerson | Nov. 21, 1922 |
| 1,662,211 | Shier | Mar. 13, 1928 |
| 2,159,772 | Schroedter | May 23, 1939 |
| 2,243,354 | Musser | May 27, 1941 |
| 2,270,002 | Glick | Jan. 13, 1942 |